United States Patent
Süss et al.

(10) Patent No.: US 12,278,418 B2
(45) Date of Patent: Apr. 15, 2025

(54) ELECTRO-MECHANICAL LINEAR DRIVE UNIT FOR PRECISE POSITIONING E.G. OF A LARGE REFLECTOR USED IN RADIO ASTRONOMY OR OF A COMMUNICATION ANTENNA

(71) Applicants: OHB Digital Connect GmbH, Bremen (DE); Max-Planck-Gesellschaft zur Förderung der Wissenschaften e.V., Munich (DE)

(72) Inventors: Martin Süss, Mainz (DE); Thomas Zimmerer, Mainz (DE); Gundolf Wieching, Bonn (DE)

(73) Assignees: OHB DIGITAL CONNECT GMBH, Bremen (DE); MAX-PLANCK-GESELLSCHAFT ZUR FORDERUNG DER WISSENSCHAFTEN E.V, Munich (DE)

( * ) Notice: Subject to any disclaimer, the term of this patent is extended or adjusted under 35 U.S.C. 154(b) by 0 days.

(21) Appl. No.: 18/018,496

(22) PCT Filed: Jul. 27, 2020

(86) PCT No.: PCT/EP2020/071102
§ 371 (c)(1),
(2) Date: Jan. 27, 2023

(87) PCT Pub. No.: WO2022/022800
PCT Pub. Date: Feb. 3, 2022

(65) Prior Publication Data
US 2023/0282958 A1 Sep. 7, 2023

(51) Int. Cl.
*H01Q 1/12* (2006.01)
*G02B 7/182* (2021.01)
(Continued)

(52) U.S. Cl.
CPC ............ *H01Q 1/125* (2013.01); *H02K 7/116* (2013.01); *H02K 7/12* (2013.01); *H01Q 15/14* (2013.01)

(58) Field of Classification Search
CPC .......... H01Q 1/12; H01Q 1/125; H01Q 15/14; G02B 23/16; G02B 7/182; G02B 7/1827;
(Continued)

(56) References Cited

U.S. PATENT DOCUMENTS 3,670,097 A 6/1972 Jones
4,270,404 A 6/1981 Murakoshi et al.
(Continued)

FOREIGN PATENT DOCUMENTS

CN 1599225 A 3/2005
CN 101235790 A 8/2008
(Continued)

OTHER PUBLICATIONS

U.S. Appl. No. 18/018,499, filed Jan. 27, 2023.

*Primary Examiner* — Tho G Phan
(74) *Attorney, Agent, or Firm* — Seed IP Law Group LLP

(57) ABSTRACT

The invention relates to a linear drive unit comprising a first and second actuator element, a guiding unit configured to enable a linear relative movement between both actuator elements, a first and second power unit, each attached to the first actuator element and configured to provide the second actuator element with a respective first and second driving force, and a control unit for controlling both power units and configured to control the first and second driving force such that the first driving force can be different from the second driving force. The invention further relates to a telescope comprising a linear drive unit as well as to a method of aligning such telescope.

20 Claims, 2 Drawing Sheets

(51) Int. Cl.
*H02K 7/11* (2006.01)
*H02K 7/116* (2006.01)
*H02K 7/12* (2006.01)
*H01Q 15/14* (2006.01)

(58) Field of Classification Search
CPC .......... G02B 7/183; H02K 7/11; H02K 7/116; H02K 7/12
See application file for complete search history.

(56) References Cited

U.S. PATENT DOCUMENTS

| | | | | |
|---|---|---|---|---|
| 4,494,025 | A | * | 1/1985 | Fickler ................ F16H 25/2018 74/25 |
| 5,489,142 | A | | 2/1996 | Mathieu |
| 5,822,116 | A | | 10/1998 | Leblanc |
| 5,836,205 | A | * | 11/1998 | Meyer .................... F16H 19/04 74/89.17 |
| 6,667,714 | B1 | * | 12/2003 | Solondz .................. H01Q 3/32 455/562.1 |
| 9,614,408 | B2 | * | 4/2017 | Funada .................... F16H 57/03 |
| 10,197,048 | B2 | | 2/2019 | Hilgers et al. |
| 10,781,902 | B2 | * | 9/2020 | Tsujimura .............. F16D 11/10 |
| 10,920,755 | B2 | | 2/2021 | Miller et al. |
| 11,811,129 | B2 | * | 11/2023 | Clifford ................ H01Q 1/1228 |
| 2003/0116684 | A1 | | 6/2003 | Rotondi |
| 2011/0239795 | A1 | | 10/2011 | Uchida |
| 2017/0204579 | A1 | | 7/2017 | Fennis et al. |

FOREIGN PATENT DOCUMENTS

| | | |
|---|---|---|
| CN | 102149944 A | 8/2011 |
| CN | 108873240 A | 11/2018 |
| CN | 110133820 A | 8/2019 |
| DE | 2155948 A1 | 5/1973 |
| JP | 2010-151230 A | 7/2010 |

* cited by examiner

ELECTRO-MECHANICAL LINEAR DRIVE UNIT FOR PRECISE POSITIONING E.G. OF A LARGE REFLECTOR USED IN RADIO ASTRONOMY OR OF A COMMUNICATION ANTENNA

TECHNICAL BACKGROUND

Radio astronomical devices, like the reflector of a radio telescope, or communication antennas must be adjustable very precisely to be able to detect weak signals from remote extraterrestrial objects.

The rotation of the telescope reflector in the elevation axis is implemented by a linearly adjustable drive unit, which is connected to the fixed and moving parts by a corresponding suspension. Extending and retracting causes the reflector to tilt around the elevation axis. Spindle drives are often used for this purpose in radio telescopes. However, they are not free of play and subject to relatively high friction.

The linear drive unit is controlled synchronously with other drive units to achieve a precise alignment and tracking of the telescope to an astronomical source. While fast movements are required to align the telescope quickly with a source or to change from one source to another, slow and high-precision trackings are required to compensate the rotation of the earth during continuous measurements.

Known electro-mechanical linear drive units have always a certain degree of play and/or friction, thereby adversely affecting the performance of the radio astronomical device. Therefore, the objective of the invention is to provide an electro-mechanical linear drive unit with minimized play and friction for precise positioning of radio astronomical devices.

DISCLOSURE OF THE INVENTION

This objective is achieved by combining high-quality drive elements in a new and highly precise linear drive unit according to claim 1, as well as by the preferred embodiments thereof defined in the dependent claims.

The linear drive unit according to the invention comprises a first and second actuator element, a guiding unit configured to enable a linear relative movement between the first and second actuator element, a first and second power unit, each attached to the first actuator element and configured to provide the second actuator element with a respective first and second driving force, and a control unit for controlling the first and second power unit and configured to control the first and second driving force such that the first driving force can be different from the second driving force.

By using two power units for driving the relative movement between the actuator elements, the respective driving forces of the power units can be mutually reinforcing. As a result, the total driving force of the linear drive unit can be up to twice as high as the maximum driving force of an individual power unit, which is advantageous for fast movements with moderate precision requirements. The ability to control the individual driving forces independently from each other allows adjusting the total driving force very precisely.

The control unit is preferably configured to control the first driving force and the second driving force such that the first driving force and the second driving force can act in opposite directions.

By controlling the individual driving forces such that they differ from each other and act in opposite directions, a slow but precise movement can be achieved, where the first driving force causes the movement and the second driving force, which is smaller than the first driving force, acts as a brake. Thereby, a play in the power units can be eliminated since both power units are always in a mechanically engaged state, not only during movement in one direction, but also when the movement is reversed or when a position is to be maintained.

When the movement is reversed, the relationship between the driving forces is reversed so that no backlash occurs unlike in conventional linear drive units. Equal driving forces acting in opposite directions further allow maintaining a precise and play-free position so that it is not affected for example by external loads from wind or the like.

In a preferred embodiment, the first power unit comprises a first motor having a first drive pinion and the second power unit comprises a second motor having a second drive pinion, wherein the first drive pinion is provided such as to mesh with a first toothed rack of the second actuator element and the second drive pinion is provided such as to mesh with the first or second toothed rack of the second actuator element.

Rack-and-pinion drives have a high efficiency, low friction losses and are space-saving and easy to implement, especially when two power units in the form of electric motors are to be used synchronously. In case both motors engage with the same toothed rack, the resulting drive forces are collinear so that a tilting torque, potentially causing inaccuracies or damages, can be avoided. A spindle drive with two power units, in contrast, would require two spaced apart spindles so that the occurrence of a tilting torque cannot be avoided.

It is further preferred that the first toothed rack and/or the second toothed rack are straight toothed racks. Straight toothed racks are rather cost-effective, easy to implement and especially well-suited for linear movements.

In a preferred embodiment, the first driving force is caused by a first driving torque generated by the first power unit and the second driving force is caused by a second driving torque generated by the second power unit and the control unit is configured to control the first and second driving torques such that they act in opposite directions, and such that the first driving torque or the second driving torque amounts to between 0% and 30%, preferably between 5% and 15% of the respective other driving torque.

Experiments have revealed that said relationship between the respective driving torques, where the braking torque is significantly smaller than the driving torque, allows to control the desired movement and to eliminate the play very precisely and reliably.

The first and second power units are preferably electric motors, in particular asynchronous electric motors, having a first and second axis of rotation, respectively, wherein the first and second axis of rotation are preferably parallel, and more preferably, coincident.

Electric motors, in particular asynchronous electric motors, are particularly well-suited, because they can be controlled very precisely. Coincident axes of rotation further help to avoid the occurrence of adverse tilting torques.

It is further preferred that the first and/or the second power unit comprises a gearbox, preferably configured as a planetary gearbox.

A gearbox adjusts the relation between torque and rotational speed of the power unit to meet the specific requirements of a corresponding application. In high-precision drive units, the rotational speed is usually reduced, thereby increasing the torque and enabling precise movements.

Planetary gearboxes are compact and can transmit high torques so that they are particularly well-suited for such applications.

In a preferred embodiment, the first or second actuator element has a cavity configured to accommodate the other actuator element.

Such a telescopic design is characterized by an advantageous load distribution, a high stability and the ability to accommodate drive components on the inside, where they are protected from external influences e.g. like dust or dirt, especially when in the retracted state. Furthermore, the risk of crushing injuries is reduced when drive components are not openly exposed and accessible.

The guiding unit comprises preferably at least one guide rail and at least one guide carriage configured to be guided along the at least one guide rail.

Linear guides with rails and carriages provide support against tilting torques, which can result from the weight of the linear drive unit itself or from operating conditions.

They are reliable, cost-efficient and easy to implement and allow precise movements so that they are particularly well-suited for high-precision linear drive units.

It is further preferred that the guide rail or the guide carriage is attached to an interior surface of the cavity. Placing the guiding unit inside the cavity has the advantage that it is protected from external influences e.g. like dust or dirt, especially when in the retracted state. Furthermore, the risk of crushing injuries is reduced when guiding components are not openly exposed and accessible.

The first and/or second actuator element preferably comprises a flange, wherein the first and/or second toothed rack is attached to a first side of the flange and at least one component of the guiding unit is attached to a second side of the flange, preferably opposite the first side of the flange.

Reducing the orthogonal distance between the drive element, i.e. the toothed rack, and the guide element, i.e. the guide rail or the guide carriage, helps to reduce tilting torques caused by the friction of the guide unit. Attaching the drive element and the guide element on opposite sides of the same flange is an effective and efficient design of a linear drive unit with closely arranged drive and guide elements.

In a preferred embodiment, the linear drive unit further comprises at least one end stop for limiting a relative movement between the first and second actuator elements, the end stop comprising a substantially elastic first element, such as a rubber or spring element, and a substantially stiff second element, such as a metal plate.

End stops prevent exceeding the permissible adjustment range and thus a potential disengagement of the drive pinion from the rack. With a two-stage end stop including a first soft end stop and a second hard end stop, potential damages of the linear drive unit can be prevented when the first end stop is hit thanks to its softness.

In case the soft end stop cannot stop the excess movement, the second end stop can reliably prevent the linear drive unit from exceeding the permissible adjustment range, taking into account potential damages of the linear drive unit to avoid more severe damages or hazards resulting from a disengagement of the drive pinion from the rack.

The first and second actuator elements are preferably connected to respective first and second attachment flanges via first and second cardan-joints (gimbal-mounted bearings).

Assembly inaccuracies or operational distortions can cause a lateral offset between the mounting points of the actuator elements and the corresponding attachment flanges. Therefore, it is advantageous to use gimbal-mounted bearings instead of simple swivel bearings in order to compensate potential lateral misalignments and to avoid inadmissible bearing forces. This further ensures that the drive element is only exposed to axial loads and not to additional loads from transverse forces.

The linear drive unit can further be part of a telescope that further comprises a support structure and a reflector, wherein one of the first and second attachment flanges is connected to the support structure, and wherein the other attachment flange is connected to the reflector, such that the reflector is rotatable around a substantially horizontal axis by means of the linear drive unit.

As telescopes must be driven very precisely in order to detect weak signals from remote extra-terrestrial objects, the linear drive unit according to the invention is well-suited for driving a telescope.

The invention can further provide a method for aligning a telescope or an antenna comprising the simultaneous steps of generating a first driving torque such that a driven face of the first drive pinion contacts a driven face of the first toothed rack in order to move the reflector to a defined position, and generating a second driving torque such that it acts in a direction opposite to the direction of the first driving torque, wherein the first driving torque is larger than the second driving torque, a retarding face of the second drive pinion contacts a retarded face of the first or second toothed rack, and the driven and retarded faces are facing in opposite directions, in order to eliminate the play between the first drive pinion and the first toothed rack.

By simultaneously generating two individual driving torques with opposite directions and different amounts causing two respective drive pinions to engage in one or two toothed racks from opposite sides, a play-free linear movement can be achieved.

The invention can further refer to a method of aligning a telescope or an antenna by simultaneously generating a first and a second driving torque, wherein the first and the second driving torques act in the same direction, have equal or different amounts, and are combined to move to a position of the reflector.

As the first and second driving torques reinforce each other, the resulting total driving torque of the linear drive unit is up to twice as high as the maximum driving torque of a single power unit, which is advantageous for fast movements with moderate precision requirements. The ability to control the individual driving torques independently from each other allows adjusting the total driving torque more precisely.

The invention can further refer to a method of aligning a telescope or an antenna by simultaneously generating a first and a second driving torque, wherein the first and the second driving torque act in opposite direction and have equal amounts, such that the reflector is held in a fixed position free of play.

By simultaneously generating two equal driving torques with opposite directions causing two respective drive pinions to engage in one or two toothed racks from opposite sides, vibrations e.g. caused by wind loads can be avoided because the play between each drive pinion and the corresponding toothed rack is eliminated.

DETAILED DESCRIPTION OF THE DRAWINGS

Figure 1:
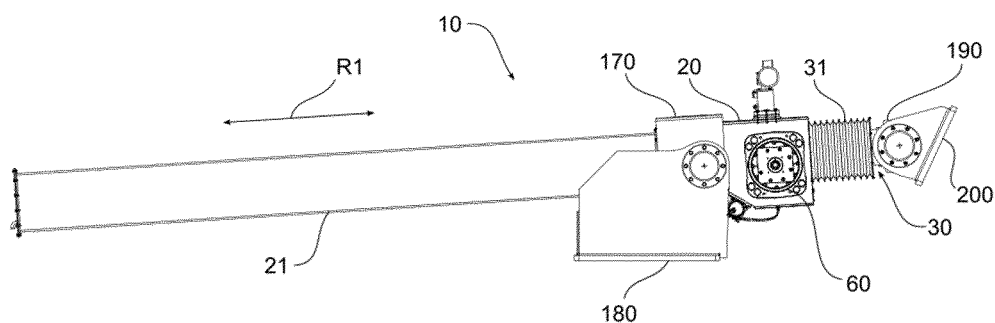
FIG. 1 is a side view of a linear drive unit according to the invention in a retracted state.
Figure 2:
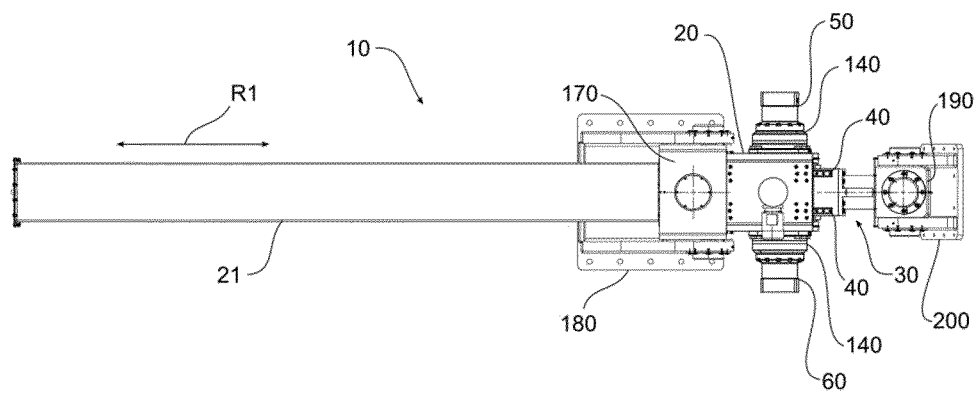
FIG. 2 is a top view of a linear drive unit according to the invention in a retracted state.

FIG. 1 and FIG. 2 show a linear drive unit 10 according to the invention comprising two actuator elements 20,30 in a retracted state. The first actuator element 20 has a hollow shape and is connected via a first cardan joint 170 with a first attachment flange 180. The second actuator element 30 has the shape of a T-beam and is connected via a second cardan joint 190 with a second attachment flange 200.

Gimbal-mounted spherical roller bearings with a swivel axis perpendicular to the linear drive unit 10 are used as cardan joints 170,190 to avoid inadmissible bearing forces by compensating a potential lateral offset between both mounting points due to assembly or operational reasons. Furthermore, it ensures that the linear drive unit 10 is only exposed to axial loads and not to other loads due to transverse forces.

The second actuator element 30 is movable inside the cavity of the first actuator element 20. It is barely visible since it is either located inside a first cover 21 attached to the first actuator element 20, i.e. in the retracted state, or inside an expandable second cover 31 attached to the second actuator element 30, i.e. in the extended state.

The first and second actuator elements 20,30 are connected via two guiding units 40, allowing a linear relative movement R1 between both actuator elements 20,30. A first and a second power unit 50,60 are attached to the first actuator element 20 from opposite sides.

Figure 3:
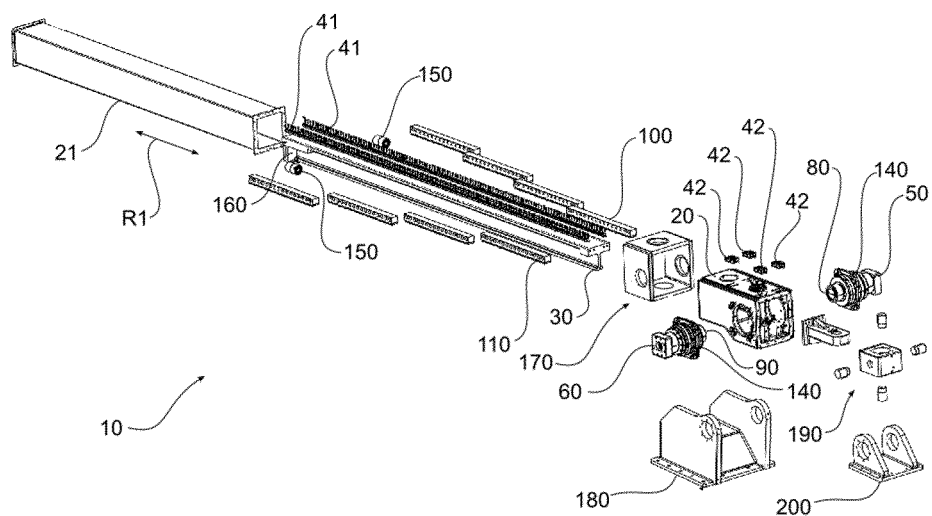
FIG. 3 is a 3-dimensional exploded view of a linear drive unit according to the invention.

FIG. 3 shows a 3-dimensional exploded view of a linear drive unit according to the invention. The guiding units 40 consist of guide rails 41, which are attached to a flange surface of the essentially T-shaped second actuator element 30, and guide carriages 42, which are attached to an inside surface of the hollow first actuator element 20.

The first and second power units 50,60, which are attached to the first actuator element 20, have gearboxes 140 and respective first and second drive pinions 80,90 that engage in respective first and second toothed racks 100,110 having several sections and being attached to flange surfaces of the second actuator element 30 opposite the guide rails 41.

The first and second power units 50,60 comprise for example a pair of asynchronous servo motors that generate the required torque together and are not shown in the drawings. Each power unit 50,60 is connected with its drive pinion 80,90 via a combination of a countershaft and a planetary gearbox 140. By engaging in the respective toothed racks 100,110, the torque of the motors is increased and translated into a linear driving force.

Besides the ability to cumulate the driving forces of both power units 50,60, they can be controlled such that they provide opposing torques. Despite the unavoidable play in the gearboxes 140 and in the teeth of the drive pinions 80,90, this ensures that a tooth flank of each drive pinion 80,90 is always in contact with the respective toothed rack 100,110 so that the play is eliminated. The required counter-torque is preferably about 5-10% of the nominal torque and can be adjusted by the control software for operational reasons.

The linear drive unit 10 further comprises a two-stage end stop, comprising an elastic element made of plastic serving as a soft end stop 150 and a metallic end surface serving as a hard end stop 160. This prevents the linear drive unit 10 from exceeding its permissible adjustment range in order to avoid a potential disengagement of the drive pinions 80,90 from the toothed racks 100,110.

Figure 4:
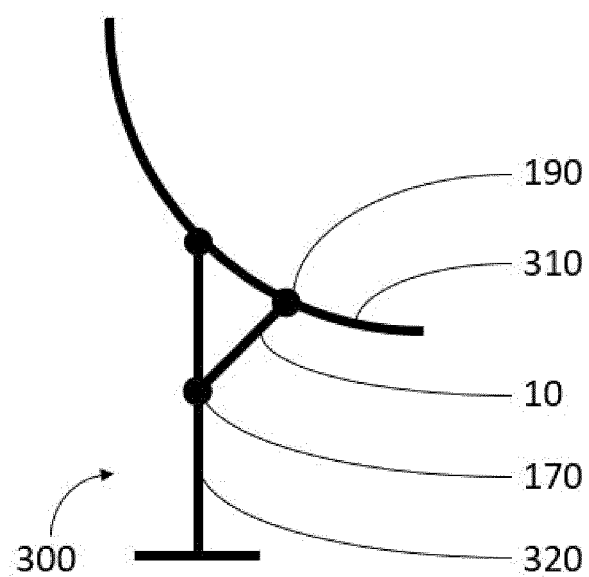
FIG. 4 is a schematic view of a linear drive unit according to the invention being installed in a telescope arrangement.

FIG. 4 shows a schematic view of a linear drive unit 10 according to the invention being installed in a telescope arrangement 300 between the telescope structure 320 and the telescope reflector 310 such that extending and retracting of the linear drive unit 10 causes a rotation of the telescope reflector 310 in the horizontal axis. It should be noted that the displayed arrangement is only exemplary and that the actual position of the linear drive unit 10 can differ.

REFERENCE LIST 10 linear drive unit
20 first actuator element
21 first cover
30 second actuator element
31 second cover
40 guiding unit
41 guide rail
42 guide carriage
50 first power unit
60 second power unit
80 first drive pinion
90 second drive pinion
100 first toothed rack
110 second toothed rack
140 gearbox
150 soft end stop
160 hard end stop
170 first cardan-joint
180 first attachment flange
190 second cardan-joint
200 second attachment flange
R1 relative movement
300 telescope arrangement
310 telescope reflector
320 telescope structure

The invention claimed is:

1. A linear drive unit with minimized play and friction for precise positions of radio astronomical devices, the linear drive unit comprising:
   a first actuator element;
   a second actuator element;
   at least a guiding unit configured to enable linear relative movement between the first actuator element and the second actuator element;
   a first power unit attached to the first actuator element and configured to provide the second actuator element with a first linear driving force;
   a second power unit attached to the first actuator element and configured to provide the second actuator element with a second linear driving force; and
   a control unit for controlling the first power unit and the second power unit, the control unit being configured to control the first driving force and the second driving force such that the first driving force and the second driving force are mutually reinforcing or act in opposite directions,
   wherein the first power unit comprises a first motor having a first drive pinion, and wherein the second power unit comprises a second motor having a second drive pinion, wherein the first drive pinion is provided so as to mesh with a first toothed rack of the second actuator element, and wherein the second drive pinion is provided so as to mesh with the first toothed rack or with a second toothed rack of the second actuator element, wherein the first driving force is caused by a first driving torque generated by the first power unit, and wherein the second driving force is caused by a second driving torque generated by the second power unit, wherein the control unit is configured to control the first and second driving torques such that the first driving torque and the second driving torque act in opposite directions, and such that the first driving torque or the second driving torque amounts to between 0% and 30% of the respective other driving torque.

2. The linear drive unit of claim 1, wherein the control unit is configured to control the first driving force and the second driving force such that the first driving force and the second driving force act in opposite directions.

3. The linear drive unit of claim 1, wherein the first toothed rack and/or the second toothed rack are straight toothed racks.

4. The linear drive unit of claim 1, wherein the first power unit comprises an electric motor, having a first axis of rotation, and wherein the second power unit comprises an electric motor, having a second axis of rotation.

5. The linear drive unit of claim 4, wherein the first power unit comprises an asynchronous motor, having a first axis of rotation, and wherein the second power unit comprises an asynchronous motor, having a second axis of rotation, wherein the first axis of rotation and the second axis of rotation are parallel.

6. The linear drive unit of claim 5, wherein the first axis of rotation and the second axis of rotation are coincident.

7. The linear drive unit of claim 1, wherein the first power unit and/or the second power unit comprises a gearbox.

8. The linear drive unit of claim 7, wherein the gearbox is configured as a planetary gearbox.

9. The linear drive unit of claim 1, wherein one of the first actuator element and the second actuator element has a cavity configured to accommodate the other one of the first actuator element and the second actuator element.

10. The linear drive unit of claim 9, wherein the guiding unit comprises at least one guide rail and at least one guide carriage configured to be guided along the at least one guide rail.

11. The linear drive unit of claim 9, wherein the guide rail or the guide carriage is attached to an interior surface of the cavity.

12. The linear drive unit of claim 1, wherein the first actuator element and/or the second actuator element comprises a flange, wherein the first toothed rack and/or the second toothed rack is attached to a first side of the flange and wherein at least one component of the guiding unit is provided on a second side of the flange.

13. The linear drive unit of claim 12, wherein the second side of the flange is an opposite side of the first side.

14. The linear drive unit of claim 1, further comprising at least one end stop for limiting a relative movement between the first actuator element and the second actuator element, the end stop comprising a substantially elastic first element such as a rubber element or a spring element, and a substantially stiff second element such as a metal plate.

15. The linear drive unit of claim 1, wherein the first actuator element is connected to a first attachment flange via a first cardan-joint, and wherein the second actuator element is connected to a second attachment flange via a second cardan-joint.

16. A telescope or an antenna comprising a support structure, a reflector, and the linear drive unit of claim 15, wherein one of the first attachment flange and the second attachment flange is connected to the support structure, and wherein the other one of the first attachment flange and the second attachment flange is connected to the reflector, such that the reflector is rotatable around a substantially horizontal axis by means of the linear drive unit.

17. A method of aligning the telescope or the antenna of claim 16, comprising the simultaneous steps of:
moving to a position of the reflector by generating the first driving torque while a driven face of the first drive pinion contacts a driven face of the first toothed rack; and
generating the second driving torque so as to act in a direction opposite to a direction of the first driving torque,
wherein an amount of the first driving torque is larger than an amount of the second driving torque,
wherein a retarding face of the second drive pinion contacts a retarded face of the first toothed rack or the second toothed rack, and
wherein the driven face and the retarded face are facing in opposite directions.

18. A method of aligning the telescope or the antenna of claim 16, comprising the simultaneous steps of:
generating a first driving torque and
generating a second driving torque,
wherein the first driving torque and the second driving torque act in the same direction,
wherein the amount of the first driving torque equals or differs from the amount of the second driving torque, and
wherein the first driving torque and the second driving torque are combined to move to a position of the reflector.

19. A method of aligning the telescope or the antenna of claim 16, comprising the simultaneous steps of:
generating a first driving torque and
generating a second driving torque,
wherein the first driving torque and the second driving torque act in opposite direction, and
wherein the amount of the first driving torque equals the amount of the second driving torque,
such that the reflector is held in a fixed position free of play.

20. The linear drive unit of claim 1, wherein the first driving torque or the second driving torque amounts to between 5% and 15% of the respective other driving torque.

* * * * *